(12) United States Patent
Huang

(10) Patent No.: US 12,294,408 B2
(45) Date of Patent: May 6, 2025

(54) OPTICAL TRANSPORT NETWORK ALARM PROCESSING METHOD AND APPARATUS, AND NETWORK MANAGEMENT SYSTEM AND MEDIUM

(71) Applicant: ZTE CORPORATION, Shenzhen (CN)

(72) Inventor: Kelu Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 464 days.

(21) Appl. No.: 17/785,636

(22) PCT Filed: Jun. 8, 2021

(86) PCT No.: PCT/CN2021/098894
§ 371 (c)(1),
(2) Date: Jun. 15, 2022

(87) PCT Pub. No.: WO2021/249393
PCT Pub. Date: Dec. 16, 2021

(65) Prior Publication Data
US 2023/0047670 A1    Feb. 16, 2023

(30) Foreign Application Priority Data
Jun. 12, 2020 (CN) .......................... 202010533023.4

(51) Int. Cl.
*H04B 10/08* (2006.01)
*H04B 10/077* (2013.01)
(Continued)

(52) U.S. Cl.
CPC ..... *H04B 10/0773* (2013.01); *H04B 10/0791* (2013.01); *H04L 41/00* (2013.01)

(58) Field of Classification Search
CPC ............ H04B 10/0791; H04B 10/0773; H04B 10/0795; H04B 10/07955; H04B 10/0771;
(Continued)

(56) References Cited

U.S. PATENT DOCUMENTS 9,014,009 B2 *  4/2015  Li .................... H04L 41/0677
                                              370/242
9,256,828 B2 *  2/2016  Lv ............................ G06N 5/04
2015/0206407 A1  7/2015  Nishisaka et al.

FOREIGN PATENT DOCUMENTS

CN      1713591 A    12/2005
CN    103152212 A     6/2013
(Continued)

OTHER PUBLICATIONS

International Searching Authority. International Search Report and Written Opinion for PCT Application No. PCT/CN2021/098894 and English translation, mailed Aug. 26, 2021, pp. 1-10.

*Primary Examiner* — Hanh Phan
(74) *Attorney, Agent, or Firm* — Vivacqua Crane, PLLC

(57) ABSTRACT

Provided are an alarm processing method and apparatus for an optical transport network, a network management system and a non-transitory computer readable storage medium. The alarm processing method for an optical transport network may include: acquiring intra-layer alarms of respective layers of a service layer by layer; acquiring a root alarm of an associated layer corresponding to a current layer based on the intra-layer alarms; and determining a service fault point based on the root alarm.

11 Claims, 5 Drawing Sheets

(51) Int. Cl.
*H04B 10/079* (2013.01)
*H04L 41/00* (2022.01)

(58) Field of Classification Search
CPC . H04B 10/0779; H04B 10/2507; H04L 41/06; H04L 41/0631; H04L 41/064; H04L 41/0645
USPC ........ 398/33, 38, 25, 26, 27, 10, 13, 17, 22, 398/23, 24, 158, 159, 79
See application file for complete search history.

(56) References Cited

FOREIGN PATENT DOCUMENTS

| | | |
|---|---|---|
| CN | 103378980 A | 10/2013 |
| EP | 1768283 A1 | 3/2007 |
| EP | 2838226 A1 | 2/2015 |

* cited by examiner

OPTICAL TRANSPORT NETWORK ALARM PROCESSING METHOD AND APPARATUS, AND NETWORK MANAGEMENT SYSTEM AND MEDIUM

CROSS-REFERENCE TO RELATED APPLICATION

This application is a national stage filing under 35 U.S.C. § 371 of international application number PCT/CN2021/098894, filed Jun. 8, 2021, which claims priority to Chinese patent application No. 202010533023.4, filed Jun. 12, 2020. The contents of these applications are incorporated herein by reference in their entirety.

TECHNICAL FIELD

The present disclosure relates to, but not limited, the technical field of optical transport network fault alarms.

BACKGROUND

As a transport network based on the wavelength division multiplexing technology and in an optical layer organization network, the Optical Transport Network (OTN) is very widely used at present, and involve access networks, convergence networks, backbone networks or the like. A single wavelength can support a service bandwidth from 10 G to 400 G, and the rate of accessed services also varies from 100 M to 100 G.

Since this network is very flexible in scheduling and the accessed services are of various types, the amount of alarm data is very huge when a fault alarm occurs in the current network, and professional operation and maintenance personnel need to perform lots of analysis and troubleshooting operations to find the specific fault point, bringing great inconvenience to maintenance.

SUMMARY

According to an embodiment of the present disclosure, provided is an alarm processing method for an optical transport network. The method may include: acquiring intra-layer alarms of respective layers of a service layer by layer; acquiring a root alarm of an associated layer corresponding to a current layer based on the intra-layer alarms; and, determining a service fault point based on the root alarm.

According to another embodiment of the present disclosure, further provided is an alarm processing apparatus for an optical transport network. The apparatus may include an intra-layer alarm acquisition module, an associated alarm acquisition module and an alarm analysis module. The intra-layer alarm acquisition module is configured to acquire intra-layer alarms of respective layers of a service layer by layer. The associated alarm acquisition module is configured to acquire a root alarm of an associated layer corresponding to a current layer based on the intra-layer alarms. The alarm analysis module is configured to determine a service fault point based on the root alarm.

According to yet another embodiment of the present disclosure, further provided is a network management system. The system may include the alarm processing apparatus for an optical transport network described above.

According to yet another embodiment of the present disclosure, further provided is a non-transitory computer readable storage medium having one or more programs stored thereon that can be executed by one or more processors to cause the one or more processors to carry out the alarm processing method for an optical transport network described above.

DETAILED DESCRIPTION

In order to make those having ordinary skills in the art better understand the technical schemes in the description, the technical schemes in one or more implementations of the description will be clearly and completely described below with reference to the accompanying drawings in one or more implementations of the description. Apparently, the one or more implementations to be described are only some but not all of the implementations of the description. All other implementations obtained by a person having ordinary skill in the art without paying any creative effort based on one or more implementations in the description shall fall into the protection scope of the present disclosure.

One of the objectives of one or more implementations of the description is to provide an alarm processing method and apparatus for an optical transport network, a network management system and a medium, which can accurately find the fault point and the fault cause and reduce the labor intensity of the operation and maintenance personnel.

In the alarm processing method for an optical transport network according to the present disclosure, after intra-layer alarms of respective layers of a service are acquired layer by layer, a key alarm of an associated layer corresponding to the intra-layer alarm of a current layer is found by utilizing an affecting and affected relationship between layers and the correlation between alarms, so that a service fault point is positioned. Accordingly, the accuracy of service fault point positioning is improved, and the labor intensity of the operation and maintenance personnel is reduced. The alarm processing method for an optical transport network and the steps thereof in the description will be described below in detail.

It is to be noted that, the alarm processing method for an optical transport network according to the present disclosure is applicable to an optical transport network, and of course, is also applicable to a situation where other similar communication networks can perform layering on a service, which also falls into the protection scope of the present disclosure.

Figure 1:
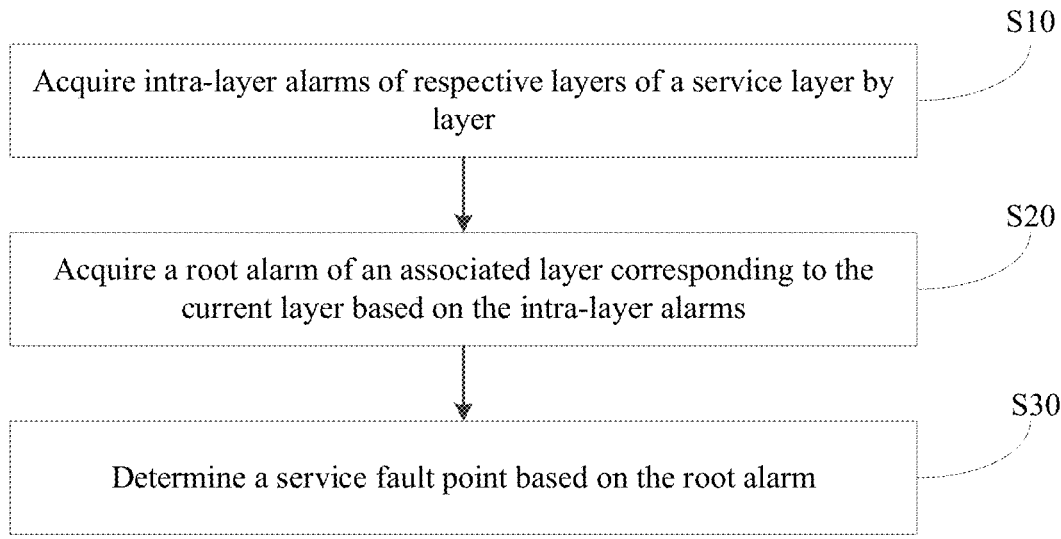
FIG. 1 is a flowchart of an alarm processing method for an optical transport network according to the present disclosure.

FIG. 1 shows a flowchart of an alarm processing method for an optical transport network according to the present disclosure. It should be understood that, in the alarm processing method for an optical transport network according to the present disclosure, a service fault point is completely automatically positioned without any manual operation, the result of analysis can be obtained, and the intervention of the operation and maintenance personnel is not needed. As shown in FIG. 1, the alarm processing method for an optical transport network may include steps S10 to S30.

At S10, intra-layer alarms of respective layers of a service are acquired layer by layer.

During the successive acquisition of intra-layer alarms of respective layers of a transport network service, the layers may be a layered structure based on the current optical transport network. For example, the current optical transport network is generally divided into a client signal layer, an optical channel layer, an optical multiplexing section layer and an optical transmission section layer from the top down. The service may also be layered according to the characteristics of the optical transport network and the attributes of the service. For example, based on the current optical transport network layering, the client signal layer is layered according to the attributes of the specific service.

It is to be noted that the correlation between alarms of the layers can be realized by utilizing the affecting and affected relationship between layers.

During acquisition of the intra-layer alarms of respective layers of the service, alarm detection points of respective layers are extracted, and alarm data on all alarm detection points of respective layers is then acquired. A determination is made based on the alarm data on whether a root alarm exists in the layers. If a root alarm exists, intra-layer alarms are searched by an intra-layer alarm searching method. The intra-layer alarms at least include the root alarm. The intra-layer alarms of respective layers are acquired.

The purpose of acquiring the intra-layer alarms of respective layers is to further acquire a key alarm of an associated layer based on the intra-layer alarms, i.e., searching a key alarm on a corresponding associated layer of the intra-layer alarms of respective layers to finally find the service fault point.

The alarm data may be classified into three classes: class A: a root alarm, which is an alarm that can trigger other alarms; class B: a derivate alarm, which is alarm that cannot be generated independently and can be classified into a forward derivative alarm and a backward derivative alarm; and, class C: an independent alarm, which is an alarm independent of other alarms. If the alarm data has no root alarm (of course, in this case, no derivative alarm is generated), no service fault point will occur in this layer. Similarly, if the alarm data has no independent alarm, no service fault point will occur in this layer. The key alarm may include a root alarm in the intra-layer alarms, and may not be a root alarm, but a relevant alarm generated by the service fault point, and the service fault point can be searched reversely based on the key alarm.

At S20, a root alarm of an associated layer corresponding to the current layer is acquired based on the intra-layer alarms.

Adjacent layers in the layers of the service may be associated layers which have an affecting and affected relationship or a serving and served relationship. Therefore, the key alarm of a corresponding associated layer can be acquired layer by layer in a certain order and direction according to the intra-layer alarms. For example, the alarms of the topmost client signal layer will be affected by the optical channel layer below the client signal layer, the alarms of the optical channel layer will be affected by the optical multiplexing section layer, and so on.

The root alarm of the associated layer is found according to the key alarm of the corresponding associated layer. The root alarm of this associated layer may lead to not only intra-layer alarms of this associated layer, but also intra-layer alarms of the current layer above and adjacent to the associated layer. Therefore, the key alarm of the corresponding associated layer is reversely searched from the intra-layer alarms of the current layer, and the root alarm of a corresponding associated layer is searched layer by layer, until the root alarm of a final associated layer is found. Thus, the service fault point can be determined based on the root alarm on the final associated layer.

In the alarm processing method for an optical transport network according to the present disclosure, the service layers are treated as having an affecting and affected relationship or a serving and served relationship, and alarm retrieval and searching of key alarms of associated layers are performed layer by layer. Accordingly, the amount of alarm data required by alarm analysis is reduced, the real position of the service fault point and the root cause are found accurately, and alarm processing is not limited to a single fault detection point or fault section. Thus, the accuracy and efficiency of service fault point searching are improved, and the labor intensity of the operation and maintenance personnel is reduced.

Therefore, when alarm analysis is performed by utilizing the alarm processing method for an optical transport network according to the present disclosure, by only executing an intelligent alarm analysis menu, an alarm processing apparatus for an optical transport network can sequentially acquire intra-layer alarms of respective layers and a key alarm of a corresponding associated layer so as to directly determine a service fault point through analysis, and can also provide a corresponding processing suggestion according to the service fault point.

At S30, a service fault point is determined based on the root alarm.

The key alarm may also lead to alarms of the corresponding associated layer in addition to the intra-layer alarms of the current layer, so that searching the key alarm is the most important to determine the service fault point. By reversely searching the key alarm of the associated layer, the final service fault point causing the key alarm is found step by step. Therefore, in the alarm processing method for an optical transport network according to the present disclosure, when a fault occurs in a service, the service is layered for alarm processing according the characteristics of the optical transport network and the attributes of the service; and, alarms (including intra-layer alarms and key alarms of associated layers) are collected, processed and analyzed from the topmost layer, in a layer-by-layer manner, according to the affecting and affected relationship between layers and the correlation between alarms. By performing intelligent alarm analysis on the faulted service, the layer where the service fault point is located is accurately positioned. Moreover, solutions can be provided, so that the operation and maintenance personnel are freed from complex and heavy alarm analysis operations.

Intelligent alarm analysis by utilizing the alarm processing method for an optical transport network according to the present disclosure will be described below in detail, on the condition that the service has been layered according to the characteristics of the optical transport network and the attributes of the service, alarm detection points are extracted and stored in a service data module and the alarm data of respective layers is acquired and stored in an alarm data module. The steps are given below.

1. A user initiates an intelligent alarm analysis request.
2. An intra-layer alarm acquisition module calls the service data module and the alarm data module to query the alarm data on each detection point of the current layer.
3. The intra-layer alarm acquisition module analyzes at least the root alarm of the current layer.
4. An associated alarm acquisition module calls the service data module and the alarm data module to query the alarm data on each detection point of the corresponding associated layer.
5. The associated alarm acquisition module analyzes the key alarm of the corresponding associated layer by the intra-layer alarm searching method.
6. The associated alarm acquisition module performs sequential searching in the order of the layers. When the root alarm of a bottommost layer is analyzed, the analysis request is terminated, and related information of the service fault point and processing suggestion are output. When an associated layer with no alarm is found, the current layer directly corresponding to the associated layer is a layer where the service fault point is located, the analysis request is terminated, and the related information of the service fault point and the processing suggestion are output.

Figure 2:
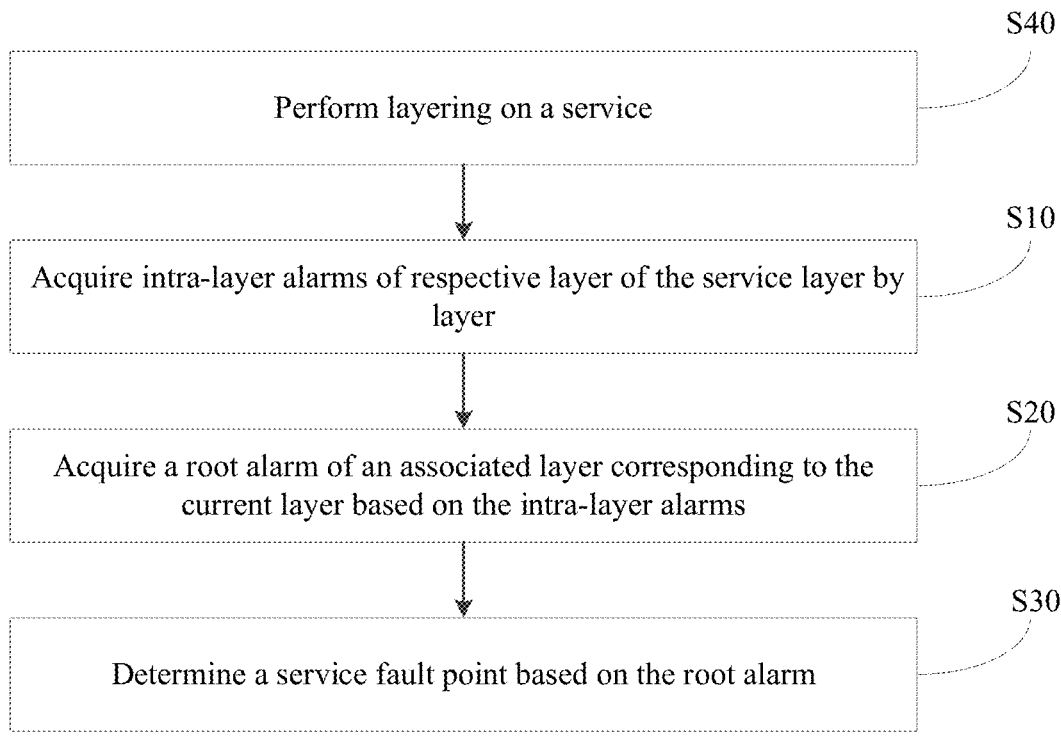
FIG. 2 is a flowchart of an alarm processing method for an optical transport network according to the present disclosure.

As shown in FIG. 2, in some implementations, prior to the step S10 of acquiring intra-layer alarms of respective layers of the service layer by layer, the alarm processing method for an optical transport network according to the present disclosure may further include: step S40: layering the service.

As described above, during the layering of the service, the service may be layered based on a layer structure of the current optical transport network or may be layered according to the characteristics of the optical transport network and the attributes of the service, as long as an assurance is made that the layers of the service have an affecting and affected relationship or a serving and served relationship. The associated layers may be adjacent layers, so the key alarm of the corresponding associated layer can be acquired layer by layer in a certain order and direction according to the intra-layer alarms.

In some implementations, in the alarm processing method for an optical transport network according to the present disclosure, the S40 of layering the service may include: according to the characteristics of the optical transport network and the attributes of the service, dividing the service into a first layer, a second layer, . . . , a $(n-1)^{th}$ layer, a $n^{th}$ layer from the top down, where the $(n-1)^{th}$ layer is a client layer, the $n^{th}$ layer is a service layer of the $(n-1)^{th}$ layer, and n is greater than or equal to 2.

The topmost layer can only be a client layer. A service layer is located below the client layer, that is, the service layer is an associated layer of the client layer. A corresponding service layer, i.e., a corresponding associated layer, is located below the service layer. It can be seen that the service layers are relative. The same layer (neither the top layer nor the bottom layer) may be a service layer of an upper layer or a client layer of a lower layer. Therefore, this layer is a client layer during the acquisition of intra-layer alarms, while this layer is a service layer of an upper layer during the acquisition of the key alarm of this layer as an associated layer.

Based on the alarm processing method for an optical transport network according to the present disclosure, the intelligent alarm analysis process will be described below, including steps B1 to B5. Hereinafter, the root alarm is at least extracted from a class-A alarm library.

At B1, a user initiates an intelligent alarm analysis request, and the intra-layer alarm acquisition module starts to execute the following steps from the topmost layer.

At B2, the intra-layer alarm acquisition module queries the alarm data on each alarm detection point of the current layer as the client layer.

At B3, a determination is made according to the alarm data on whether a root alarm presents in the current layer as the client layer.

At B31, if no root alarm presents, no fault occurs in the current service, and the process ends.

At B32, if a root alarm presents, the intra-layer alarm acquisition module finds an intra-layer alarm and an alarm detection point of the current layer as the client layer by the intra-layer alarm retrieval method.

At B4, the associated alarm acquisition module determines whether a service layer presents in the current layer as the client layer.

At B41, if no service layer presents, the alarm detection point where the root alarm of the current layer as the client layer is located is a service fault point, and step B5 will be executed.

At B42, if a service layer presents, the associated alarm acquisition module queries the alarm data of the corresponding service layer and determines whether a root alarm presents in this service layer.

At B421, if no root alarm presents, the alarm detection point where the root alarm of the current layer as the client layer is located is a service fault point, and step B5 will be executed.

At B422, if a root alarm presents, the associated alarm acquisition module finds the root alarm of this service layer by the intra-layer alarm retrieval method, the service layer is set as the current layer as the client layer, and step B4 is repeated.

At B5, the related information of the service fault point and the processing suggestion are output, and the process ends.

The intra-layer alarm acquisition module and the associated alarm acquisition module may be integrated into one service processing module.

Figure 3:
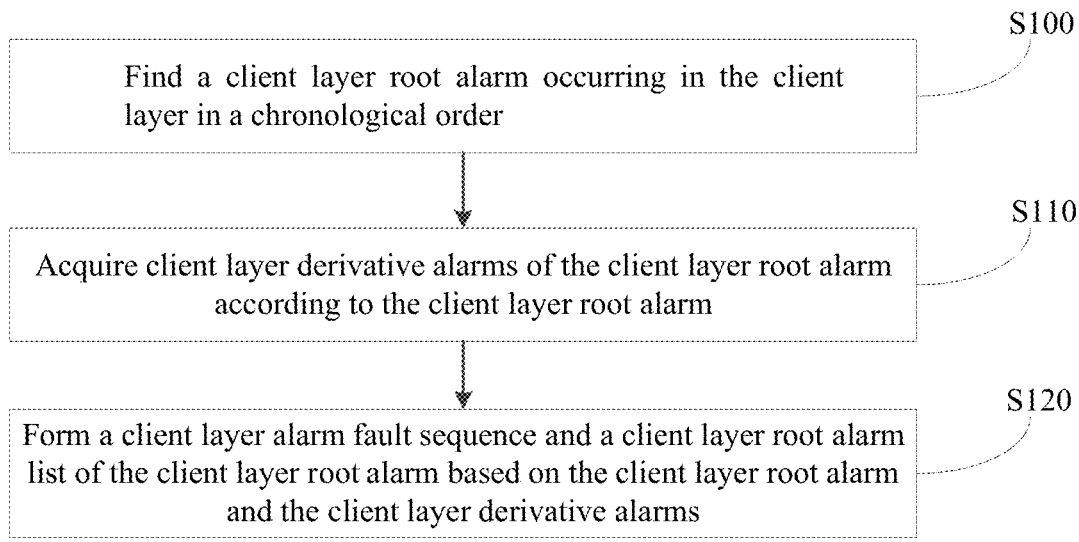
FIG. 3 is a flowchart of an alarm processing method for an optical transport network according to the present disclosure.

As shown in FIG. 3, in some implementations, in the alarm processing method for an optical transport network according to the present disclosure, the step S10 of acquiring intra-layer alarms of respective layers layer-by-layer may include steps S100 to S120.

At S100, a client layer root alarm occurring in the client layer is found in a chronological order.

The alarm can be classified into three classes: class A: a root alarm, which is an alarm that can trigger other alarms; class B: a derivate alarm, which is alarm that cannot be generated independently and is classified into a forward derivative alarm and a backward derivative alarm; and, class C: an independent alarm, which is an alarm independent of other alarms. During the acquisition of intra-layer alarms, the class-A alarms are sorted in a time sequence of alarm occurrence time, and the client layer root alarms are sorted as [alarm 1-1, alarm 1-2, alarm 1-3, . . . ] in an order from earlier to later occurrence time.

At S110, A client layer derivative alarm of the client layer root alarm is acquired according to the client layer root alarm.

The position of the alarm detection point where the root alarm [alarm 1-1] occurs is found. In the order of alarm detection points in an upward direction of the service flow, all alarms on a next alarm detection point after the time node when the root alarm [alarm 1-1] occurs are searched, so as to find all client layer derivative alarms of the root alarm [alarm 1-1] in the current layer. A class-A alarm library and a class-B alarm library are updated according to the result of searching. The class-A alarm library and the class-B alarm library are set to facilitate the extraction of class-A alarms and class-B alarms during the analysis of alarms of respective layers.

The step S110 is repeated until all alarm detection points are searched.

At S120, a client layer alarm fault sequence and a client layer root alarm list of the client layer root alarm are formed based on the client layer root alarm and the client layer derivative alarms, where the client layer root alarm list includes all client layer root alarms of this client layer.

The intra-layer alarms searched based on steps S100 A and S110 are a client layer alarm fault sequence [alarm fault sequence 1-1, alarm fault sequence 1-2, alarm fault sequence 1-3, . . . ,]. The remaining root alarms of this client are subjected to the same processing until all alarm detection points are retrieved. All independent alarms are grouped into a fault sequence.

The acquired intra-layer alarms may include the following.

1. The intra-layer alarms are classified according to the fault sequence. From the top down, the client layer alarm fault sequence of the first layer is [alarm fault sequence 1-1, alarm fault sequence 1-2, alarm fault sequence 1-3, . . . ,], the client layer alarm fault sequence of the second layer is [alarm fault sequence 2-1, alarm fault sequence 2-2, alarm fault sequence 2-3, . . . ,], . . . , the client layer alarm fault sequence of the $n^{th}$ layer is [alarm fault sequence n–1, alarm fault sequence n–2, alarm fault sequence n–3, . . . ,]. Each client layer alarm fault sequence contains all alarms related to this fault. The formation of the client layer alarm fault sequence is to subsequently search the root alarm of the corresponding service layer by utilizing the key alarm of the corresponding service layer, and to subsequently display the fault information of respective layers of the service to the operation and maintenance personnel graphically in time.

2. Each client layer fault sequence has only one class-A alarm, i.e., client layer root alarm. The client layer root alarm is the key alarm of the client layer fault sequence. All key alarms of the current layer can form the client layer key alarm list of the current layer. The client layer key alarm list of the first layer is [alarm 1-1, alarm 1-2, alarm 1-3, . . . ]; the client layer key alarm list of the second layer is [alarm 2-1, alarm 2-2, alarm 2-3, . . . ]; and, client layer key alarm list of the $n^{th}$ layer is [alarm n-1, alarm n-2, alarm n–3, . . . ]. In addition, the client layer root alarm of the current layer is a client layer key alarm in the client layer key alarm list of the current layer.

3. All independent alarms are grouped into a fault sequence, and these alarms have no impact on the service.

Figure 4:
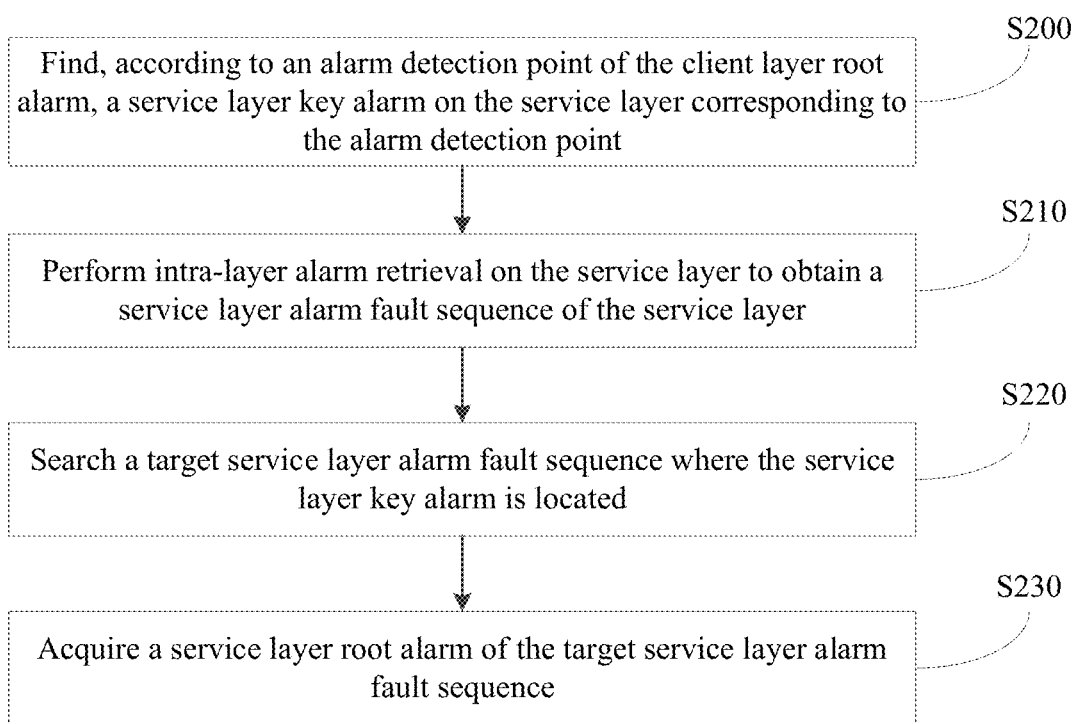
FIG. 4 is a flowchart of an alarm processing method for an optical transport network according to the present disclosure.

As shown in FIG. 4, in some implementations, in the alarm processing method for an optical transport network according to the present disclosure, the step S20 of acquiring a root alarm of an associated layer corresponding to the current layer based on the intra-layer alarms may include steps S200 to S230.

At S200, according to an alarm detection point of the client layer root alarm, a service layer key alarm on the service layer corresponding to the alarm detection point is found.

After searching of the intra-layer root alarm of the first client layer is completed, the key alarm of the corresponding associated layer is searched by the following steps: performing intra-layer alarm retrieval on the client layer to obtain a client layer root alarm list [alarm 1-1, alarm 1-2, alarm 1-3, . . . ,]; and, according to the position of the alarm detection point where the client layer root alarm [alarm 1-1] occurs, finding a key alarm on a corresponding service layer corresponding to the alarm detection point. The key alarm has a serial number of [alarm 2'-1].

At S210, intra-layer alarm retrieval is performed on the service layer to obtain a service layer alarm fault sequence of the service layer.

Intra-layer alarm retrieval is performed on the service layer to obtain a service layer alarm fault sequence [alarm fault sequence 2-1, alarm fault sequence 2-2, alarm fault sequence 2-3, . . . ] and a service layer root alarm list [alarm 2-1, alarm 2-2, alarm 2-3, . . . ].

At S220, a target service layer alarm fault sequence where the service layer key alarm is located is searched.

Intra-layer alarm retrieval is performed on the service layer to obtain a service layer alarm fault sequence [alarm fault sequence 2-1, alarm fault sequence 2-2, alarm fault sequence 2-3, . . . ] and a service layer root alarm list [alarm 2-1, alarm 2-2, alarm 2-3, . . . ].

A target service layer alarm fault sequence where the key alarm [alarm 2'-1] in the service layer is located is searched to obtain a root alarm [alarm2@-1] of this service layer alarm fault sequence.

Step S200 is repeatedly performed on the root alarm [alarm2@-1] until the service layer root alarm of the bottommost layer is found. The alarm detection point where the service layer root alarm of the bottommost layer is located is the final service fault point.

At S230, a service layer root alarm of the target service layer alarm fault sequence is acquired. The steps S200 and S210 are repeated, and the client layer root alarms [alarm 1-2, alarm 1-3, . . . ] in the client layer root alarm list are retrieved layer by layer.

After the above steps are completed, for all client layer root alarms of the client layer, the service root alarm corresponding to the service layer in the bottommost layer can be found from the root alarm of the topmost layer of the service. The service layer root alarm on the bottommost layer is the original alarm, and the position of the alarm detection point where the service root alarm of the bottommost layer is located is the service fault point.

Figure 5:
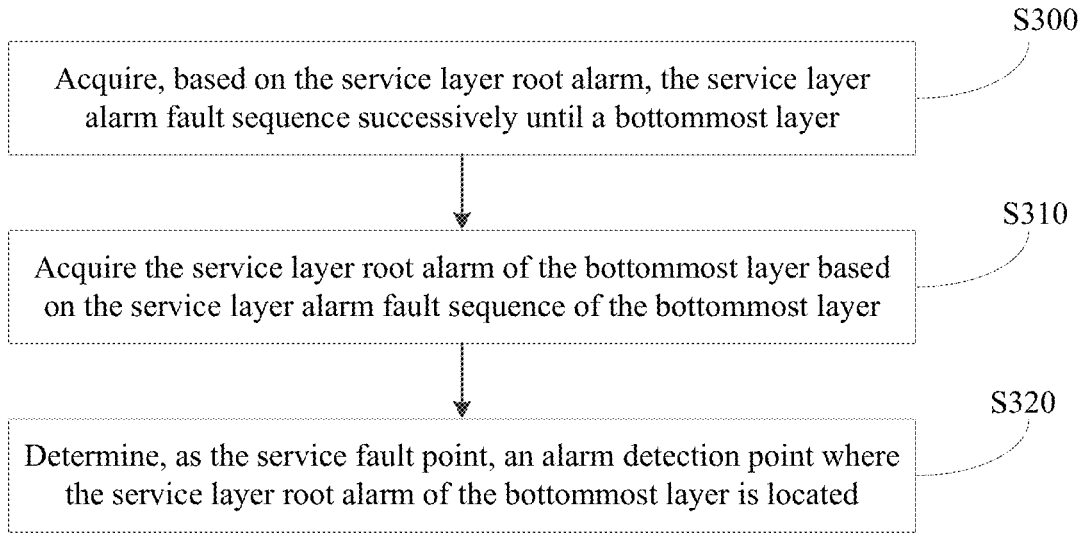
FIG. 5 is a flowchart of an alarm processing method for an optical transport network according to the present disclosure.

As shown in FIG. 5, in some implementations, in the alarm processing method for an optical transport network according to the present disclosure, the step S30 of determining a service fault point based on the root alarm may include steps S300 to S320.

At S300, based on the service layer root alarm, the service layer alarm fault sequence is acquired layer by layer until a bottommost layer.

After searching of the root alarm in the intra-layer alarms is completed, the root alarm of the associated layer is acquired by the following steps: performing intra-layer alarm retrieval on the client layer to obtain a client layer root alarm list [alarm 1-1, alarm 1-2, alarm 1-3, . . . ]; and, according to the position of the alarm detection point where the client root alarm [alarm 1-1] occurs, finding a key alarm at the corresponding alarm detection point on the corresponding service layer. The key alarm on the service layer corresponding to the client layer root alarm [alarm 1-1] has a serial number of [alarm 2'-1].

At S310, the service layer root alarm of the bottommost layer is acquired based on the service layer alarm fault sequence of the bottommost layer.

Intra-layer alarm retrieval is performed on the service layer to obtain a service layer alarm fault sequence [alarm fault sequence 2-1, alarm fault sequence 2-2, alarm fault sequence 2-3, . . . ] and a service layer root alarm list [alarm 2-1, alarm 2-2, alarm 2-3, . . . ].

A target service layer alarm fault sequence where the key alarm [alarm 2'-1] in the service layer is located is searched to obtain a root alarm [alarm2@-1] of this service layer alarm fault sequence.

S300 is repeatedly performed on the root alarm [alarm2@-1] until the service layer root alarm of the bottommost layer is found. The alarm detection point where the service layer root alarm of the bottommost layer is located is the final service fault point.

At S320, an alarm detection point where the service layer root alarm of the bottommost layer is located is determined as the service fault point.

The steps S300 and S310 are repeated, and the client layer root alarms [alarm 1-2, alarm 1-3, . . . ] in the client layer root alarm list are retrieved layer by layer.

After the above steps are completed, for all client layer root alarms of the client layer, the service root alarm corresponding to the service layer in the bottommost layer can be found from the root alarm of the topmost layer of the service. The service layer root alarm on the bottommost layer is the original alarm, and the position of the alarm detection point where the service root alarm of the bottommost layer is located is the service fault point.

Figure 6:
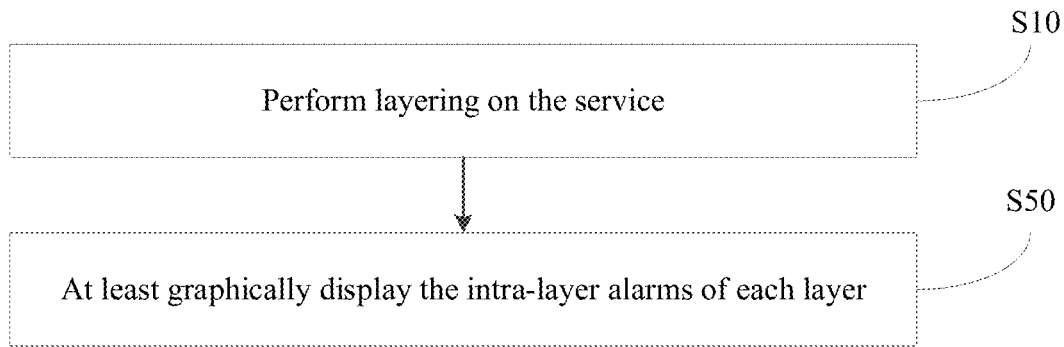
FIG. 6 is a flowchart of an alarm processing method for an optical transport network according to the present disclosure.

As shown in FIG. 6, after the step S10 of acquiring intra-layer alarms of respective layers layer-by-layer, the alarm processing method for an optical transport network further includes: step S50: at least graphically displaying the intra-layer alarms of respective layers.

The intra-layer alarms of respective layers can be at least graphically presented to display the corresponding intra-layer alarms in respective layers.

When a fault occurs in a certain service, this server can be layered, an alarm detection point of each layer is extracted, and intra-layer alarms of respective layers are at least graphically displayed according to a layering result of the service. The service fault point or other information may also be included. The operation and maintenance personnel can intuitively view the alarm data of respective layers from a source node, intermediate nodes and a tail node of the service. The service may include a one-way service and a two-way service.

The exemplary processing process of graphically displaying end-to-end layered alarms of the service by utilizing the alarm processing method for an optical transport network according to the implementations of the description will be described below, on the condition that the service has been layered and the service layering information is stored in a service data module. The process may include the following.

1. A user initiates a service end-to-end alarm request.

2. An intra-alarm acquisition module extracts alarm detection point information of respective layers according to the service layering information, and stores the service alarm detection point information in the service data module.

3. The intra-alarm acquisition module acquires alarm information on the alarm detection point of respective layers according to the service data module, and stores the alarm information in an alarm data module.

4. The intra-alarm acquisition module analyzes and processes the alarm information of respective layers by the intra-layer alarm searching method to obtain a client layer alarm fault sequence of respective layers.

5. The intra-alarm acquisition module queries the alarm data module to obtain the client layer alarm fault sequence on respective layers, and outputs the client layer alarm fault sequence to an alarm display module.

6. The alarm display module graphically displays the alarm information in an end-to-end manner according to the service layer, where for layers with alarms, the layers are displayed according to the client layer alarm fault sequence, respectively; and, for layers with no alarm, only the alarm detection points of the layers are displayed.

Figure 7:
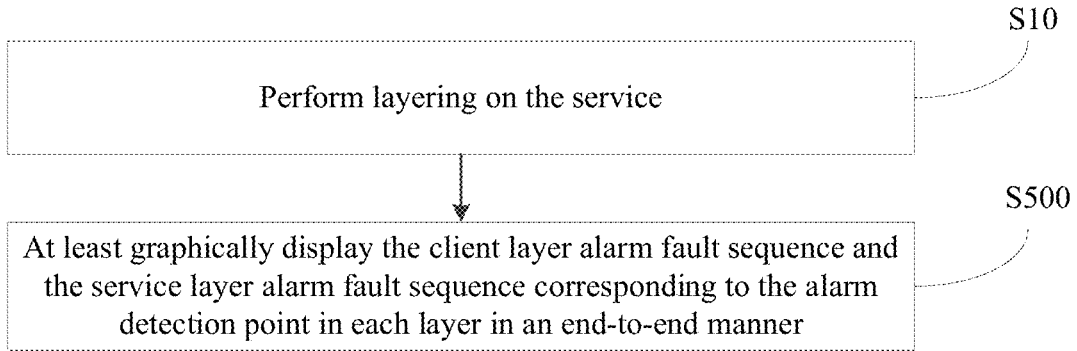
FIG. 7 is a flowchart of an alarm processing method for an optical transport network according to the present disclosure.

As shown in FIG. 7, in some implementations, in the alarm processing method for an optical transport network according to the present disclosure, the step S50 of at least graphically displaying the intra-layer alarms of respective layers may include: step S500: at least graphically displaying the client layer alarm fault sequence and the service layer alarm fault sequence corresponding to the alarm detection point in respective layers in an end-to-end manner.

The service layer information is stored in the service data module at the above step, and the following steps are executed from the topmost layer.

At A2, related alarm detection points of the current layer are extracted to establish an alarm detection point list of the current layer, and the alarm detection point information is stored in a service database.

At A3, alarm data on all alarm detection points of the current layer is acquired, and the alarm data is stored in the alarm data module.

At A4, a determination is made on whether a root alarm presents in the current layer. At A41, if no root alarm presents, step S6 will be executed. At A42, if a root alarm presents, the intra-layer alarm acquisition module searches intra-layer alarms (at least including root alarms) by the intra-layer alarm retrieval method, to obtain intra-layer alarms of this layer.

At A5, a determination is made on whether a service layer presents in the current layer. At A51, if no service layer presents, step A6 will be executed. At A52, if a service layer presents, step A2 will be repeatedly executed on the service layer.

Figure 11:
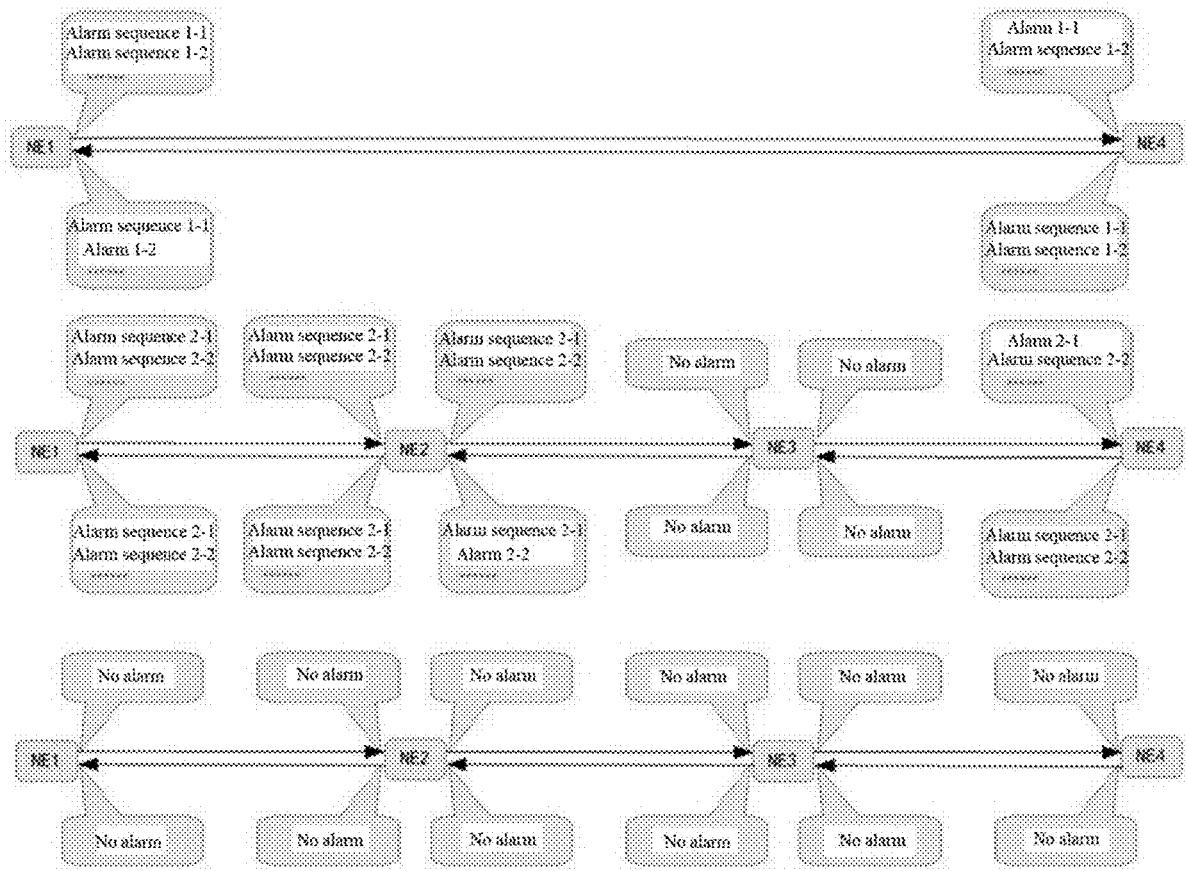
FIG. 11 is schematic diagram of a display interface of an alarm display module in the alarm processing apparatus for an optical transport network according to the present disclosure.

At A6, for a layer with alarms, from a first node of the service to a tail node of the service, the intra-layer alarms of this layer are at least graphically displayed according to the fault sequence in an end-to-end manner; and, for a layer with no alarm, only the alarm detection point of this layer is displayed, as shown in FIG. 11.

When the alarm processing method for an optical transport network according to the present disclosure is adopted, after the user initiates a service alarm analysis request, the intra-layer alarm acquisition module in the service processing module extracts the alarm detection point information of respective layers according to the layering information, respectively, and stores the service alarm detection point information in the service data module; acquires the alarm information on the detection points of the layers, and stores the result in the alarm data module; analyzes and processes the alarm information of the layers by the intra-layer alarm searching method to obtain the alarm fault sequence of each layer; and, outputs the alarm fault sequence result of each layer to the alarm display module. The alarm display module graphically displays the alarm information according to the service layer in an end-to-end manner. For layers with alarms, the layers are displayed according to the fault sequence, respectively; and, for layers with no alarm, only the alarm detection points of the layers are displayed.

As can be seen from the above analysis, in the alarm processing method for an optical transport network according to the present disclosure, intra-layer alarms of respective layers are acquired layer by layer after the service is layered; then, the key alarm of the corresponding associated later is found based on the intra-layer alarms of the current layer according to the correlation between layers; and, the service fault point is determined by utilizing the key alarm. Therefore, the service fault point is accurately positioned by utilizing the correlation between alarms of different layers of the services, and solutions are provided. Accordingly, the operation and maintenance personnel do not need to analyze and process the alarms, and the labor intensity of the operation and maintenance personnel is reduced. In addition, in the alarm processing method for an optical transport network according to the present disclosure, the intra-layer alarms of respective layers can be at least graphically displayed, facilitating the operation and maintenance personnel to intuitively know the intra-layer alarms of respective layers of the service to prepare in time.

Figure 8:
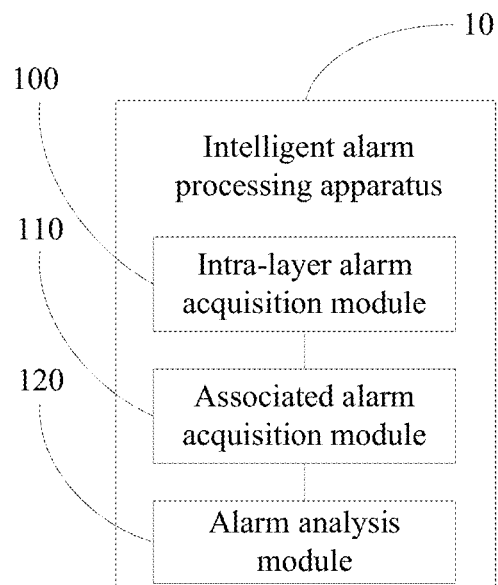
FIG. 8 is a schematic structural diagram of an alarm processing apparatus for an optical transport network according to the present disclosure.

As shown in FIG. 8, an intelligent alarm processing apparatus (e.g., an alarm processing apparatus for an optical transport network) 10 according to the present disclosure is provided. The apparatus includes an intra-layer alarm acquisition module 100, an associated alarm acquisition module 110 and an alarm analysis module 120.

The intra-layer alarm acquisition module 100 is configured to acquire intra-layer alarms of respective layers, layer by layer.

During the successive acquisition of intra-layer alarms of respective layers of a transport network service, the layers may be a layered structure based on the current optical transport network. For example, the current optical transport network is generally divided into a client signal layer, an optical channel layer, an optical multiplexing section layer and an optical transmission section layer from the top down. The service may also be layered according to the characteristics of the optical transport network and the attributes of the service. For example, based on the current optical transport network layering, the client signal layer is layered according to the attributes of the specific service.

It is to be noted that the correlation between alarms of the layers can be realized by utilizing the affecting and affected relationship between layers.

During acquisition of the intra-layer alarms of respective layers of the service, alarm detection points of respective layers are extracted, and alarm data on all alarm detection points of each layer is then acquired. A determination is made based on the alarm data on whether an alarm exists in each layer. If an alarm exists, intra-layer alarms are searched by an intra-layer alarm searching method, and the intra-layers of respective layers are acquired. The intra-layer alarms at least include root alarms. The retrieval result of intra-layer alarms is acquired.

The purpose of acquiring the intra-layer alarms of respective layers is to further acquire a key alarm of an associated layer based on the intra-layer alarms, i.e., searching a key alarm on a corresponding associated layer of the intra-layer alarms of respective layers, to finally find the service fault point.

The alarm data may be classified into three classes: class A: a root alarm, which an alarm that can trigger other alarms; class B: a derivate alarm, which is alarm that cannot be generated independently and can be classified into a forward derivative alarm and a backward derivative alarm; and, class C: an independent alarm, which is an alarm independent of other alarms. If the alarm data has no root alarm (of course, in this case, no derivative alarm is generated), no service fault point will occur in this layer. Similarly, if the alarm data has no independent alarm, no service fault point will occur in this layer. The key alarm may include a root alarm in the intra-layer alarms. The key alarm is a relevant alarm generated by the fault point, and the service fault point can be searched reversely based on the key alarm.

The associated alarm acquisition module 110 is configured to acquire a root alarm of an associated layer corresponding to the current layer based on the intra-layer alarms.

Adjacent layers in the layers of the service may be associated layers which have an affecting and affected relationship or a serving and served relationship. Therefore, the key alarm of a corresponding associated layer can be acquired layer by layer in a certain order and direction according to the intra-layer alarms. For example, the alarms of the topmost client signal layer will be affected by the optical channel layer below the client signal layer, the alarms of the optical channel layer will be affected by the optical multiplexing section layer, and so on.

The root alarm of the associated layer is found according to the key alarm of the corresponding associated layer. The root alarm of this associated layer may lead to not only intra-layer alarms of this associated layer, but also intra-layer alarms of the current layer above and adjacent to the associated layer. Therefore, the key alarm of the corresponding associated layer is reversely searched from the intra-layer alarms of the current layer, and the root alarm of a corresponding associated layer is searched layer by layer, until the root alarm of a final associated layer is found. Thus, the service fault point can be determined based on the root alarm on the final associated layer.

In the alarm processing apparatus for an optical transport network according to the present disclosure, the service layers are treated as having an affecting and affected relationship or a serving and served relationship, and alarm retrieval and searching of key alarms of associated layers are performed layer by layer. Accordingly, the amount of alarm data required by alarm analysis is reduced, the real position of the service fault point and the root cause are found accurately, and alarm processing is not limited to a single fault detection point or fault section. Thus, the accuracy and efficiency of service fault point searching are improved, and the labor intensity of operation and maintenance personnel is reduced.

Therefore, when alarm analysis is performed by utilizing the alarm processing apparatus for an optical transport network according to the present disclosure, by only executing an intelligent alarm analysis menu, the alarm processing apparatus for an optical transport network can sequentially acquire intra-layer alarms of respective layers and a key alarm of a corresponding associated layer so as to determine a service fault point through analysis, and can also provide a corresponding processing suggestion according to the service fault point.

The alarm analysis module 120 is configured to determine a service fault point based on the root alarm.

The key alarm may also lead to alarms of the corresponding associated layer in addition to the intra-layer alarms of the current layer, so that searching the key alarm is the most important to determine the service fault point. By reversely searching the key alarm of the associated layer, the final service fault point causing the key alarm is found step by step. Therefore, in the alarm processing apparatus for an optical transport network according to the present disclosure, when a fault occurs in a service, the service is layered for alarm processing according the characteristics of the optical transport network and the attributes of the service; and, alarms (including intra-layer alarms and key alarms of associated layers) are collected, processed and analyzed from the topmost layer, layer by layer according to the affecting and affected relationship between layers and the correlation between alarms. By performing alarm analysis on the faulted service, the layer where the service fault point is located is accurately positioned. Moreover, solutions can be provided, so that the operation and maintenance personnel are freed from complex and heavy alarm analysis operations.

Intelligent alarm analysis by utilizing the alarm processing apparatus for an optical transport network according to the present disclosure will be described below in detail, on the condition that the service has been layered according to the characteristics of the optical transport network and the attributes of the service, alarm detection points are extracted and stored in a service data module and the alarm data of respective layers is acquired and stored in an alarm data module. The steps are given below.

1. A user initiates an intelligent alarm analysis request.
2. An intra-layer alarm acquisition module calls the service data module and the alarm data module to query the alarm data on each detection point of the current layer.
3. The intra-layer alarm acquisition module analyzes at least the root alarm of the current layer.
4. An associated alarm acquisition module calls the service data module and the alarm data module to query the alarm data on each detection point of the corresponding associated layer.
5. The associated alarm acquisition module analyzes the key alarm of the corresponding associated layer by the intra-layer alarm searching method.
6. The associated alarm acquisition module performs sequential searching in the order of the layers. When the root alarm of the bottommost layer is analyzed, the analysis request is terminated, and related information of the service fault point and processing suggestion are output. When an associated layer with no alarm is found, the current layer directly corresponding to the associated layer is a layer where the service fault point is located, the analysis request is terminated, and the related information of the service fault point and the processing suggestion are output.

The alarm processing apparatus 10 for an optical transport network according to the present disclosure may further include a service processing module, a service data module an alarm data module and an alarm display module.

The service processing module is configured to perform layering on the service and process service alarm detection point information.

The service data module is configured to store the service data, including service basic data, service layering data and service alarm detection point data.

The alarm analysis module is configured to query alarm data, perform alarm classification, and perform retrieval analysis on the intra-layer alarms and the key alarm of the associated layer.

The alarm data module is configured to store alarm data on each alarm detection point of each layer, store alarm classification information and store alarm fault sequence information.

The alarm display module is configured to display the alarm information of respective layers of the service graphically or in a form of list.

Figure 9:
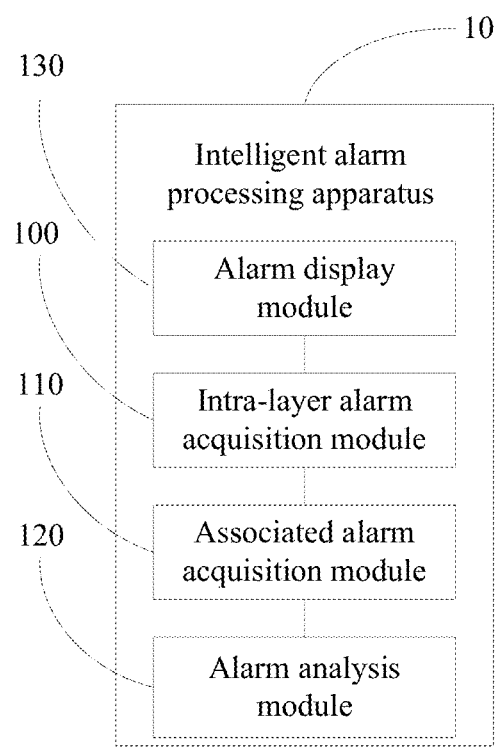
FIG. 9 is a schematic structural diagram of an alarm processing apparatus for an optical transport network according to the present disclosure.

As shown in FIG. 9, the alarm processing apparatus 10 for an optical transport network further includes an alarm display module 130 configured to at least graphically display the intra-layer alarms of respective layers.

When the alarm processing apparatus for an optical transport network according to the present disclosure is adopted, after the user initiates a service alarm analysis request, the intra-layer alarm acquisition module in the service processing module extracts the alarm detection point information of each layer according to the layering information, respectively, and stores the service alarm detection point information in the service data module; acquires the alarm information on each detection point of each layer, and stores the result in the alarm data module; analyzes and processes the alarm information of each layer by the intra-layer alarm searching method to obtain the alarm fault sequence of each layer; and, outputs the alarm fault sequence result of each layer to the alarm display module. The alarm display module graphically displays the alarm information according to the service layer in an end-to-end manner. For layers with alarms, the layers are displayed according to the fault sequence, respectively; and, for layers with no alarm, only the alarm detection points of the layers are displayed.

As can be seen from the above analysis, in the alarm processing apparatus for an optical transport network according to the present disclosure, intra-layer alarms of respective layers are acquired layer by layer after the service is layered; then, the key alarm of the corresponding associated later is found based on the intra-layer alarms of the current layer according to the correlation between layers; and, the service fault point is determined by utilizing the key alarm. Therefore, the service fault point is accurately positioned by utilizing the correlation between alarms of different layers of the services, and solutions are provided. Accordingly, the operation and maintenance personnel do not need to analyze and process the alarms, and the labor intensity of the operation and maintenance personnel is reduced. In addition, in the alarm processing apparatus for an optical transport network according to the present disclosure, the intra-layer alarms of respective layers can be at least graphically displayed, facilitating the operation and maintenance personnel to intuitively know the intra-layer alarms of respective layers of the service to prepare in time.

Figure 10:
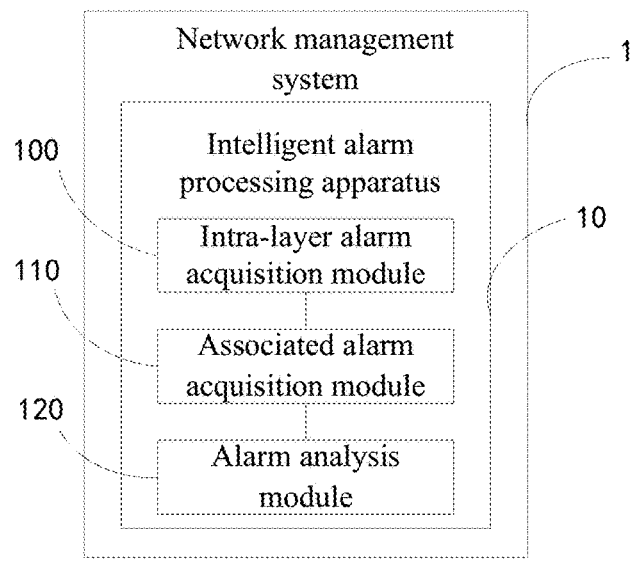
FIG. 10 is a schematic structural diagram of a network management system according to the present disclosure.

As shown in FIG. 10, a network management system 1 according to the present disclosure is provided. The network management system 1 includes the alarm processing apparatus 10 for an optical transport network described above. The alarm processing apparatus 10 for an optical transport network may include an intra-layer alarm acquisition module 100, an associated alarm acquisition module 110 and an alarm analysis module 120.

The intra-layer alarm acquisition module 100 is configured to acquire intra-layer alarms of respective layers, layer by layer.

During the successive acquisition of intra-layer alarms of respective layers of a transport network service, the layers may be a layered structure based on the current optical transport network. For example, the current optical transport network is generally divided into a client signal layer, an optical channel layer, an optical multiplexing section layer and an optical transmission section layer from the top down. The service may also be layered according to the characteristics of the optical transport network and the attributes of the service. For example, based on the current optical transport network layering, the client signal layer is layered according to the attributes of the specific service.

It is to be noted that the correlation between alarms of the layers can be realized by utilizing the affecting and affected relationship between layers.

During acquisition of the intra-layer alarms of respective layers of the service, alarm detection points of respective layers are extracted, and alarm data on all alarm detection points of the layers is then acquired. A determination is made based on the alarm data on whether a root alarm exists in the layers. If a root alarm exists, intra-layer alarms are searched by an intra-layer alarm searching method, and the intra-layers of each layer are acquired. The intra-layer alarms at least include root alarms. The retrieval result of the intra-layer alarms is acquired.

The purpose of acquiring the intra-layer alarms of each layer is to further acquire a key alarm of an associated layer based on the intra-layer alarms, i.e., searching a key alarm on a corresponding associated layer of the intra-layer alarms of each layer to finally find the service fault point.

The alarm data may be classified into three classes: class A: a root alarm, which an alarm that can trigger other alarms; class B: a derivate alarm, which is alarm that cannot be generated independently, and which can be classified into a forward derivative alarm and a backward derivative alarm; and, class C: an independent alarm, which is an alarm independent of other alarms. If the alarm data has no root alarm (of course, in this case, no derivative alarm is generated), no service fault point will occur in this layer. Similarly, if the alarm data has no independent alarm, no service fault point will occur in this layer. The key alarm may include a root alarm in the intra-layer alarms, and may not be a root alarm, but a relevant alarm generated by the service fault point, and the service fault point can be searched reversely based on the key alarm.

The associated alarm acquisition module 110 is configured to acquire a root alarm of an associated layer corresponding to the current layer based on the intra-layer alarms.

Adjacent layers in the layers of the service may be associated layers which have an effecting or affected relationship or a serving and served relationship. Therefore, the key alarm of a corresponding associated layer can be acquired layer by layer in a certain order and direction according to the intra-layer alarms. For example, the alarms of the topmost client signal layer will be affected by the optical channel layer below the client signal layer, the alarms of the optical channel layer will be affected by the optical multiplexing section layer, and so on.

The root alarm of the associated layer is found according to the key alarm of the corresponding associated layer. The root alarm of this associated layer may lead to not only intra-layer alarms of this associated layer, but also intra-layer alarms of the current layer above and adjacent to the associated layer. Therefore, the key alarm of the corresponding associated layer is reversely searched from the intra-layer alarms of the current layer, and the root alarm of a corresponding associated layer is searched layer by layer, until the root alarm of a final associated layer is found. Thus, the service fault point can be determined based on the root alarm on the final associated layer.

In the network management system according to the present disclosure, the service layers are treated as having an affecting and affected relationship or a serving and served relationship, and alarm retrieval and searching of key alarms of associated layers are performed layer by layer. Accordingly, the amount of alarm data required by alarm analysis is reduced, the real position of the service fault point and the root cause are found accurately, and alarm processing is not limited to a single fault detection point or fault section. Thus, the accuracy and efficiency of service fault point searching are improved, and the labor intensity of operation and maintenance personnel is reduced.

Therefore, when alarm analysis is performed by utilizing the alarm processing system for an optical transport network according to the present disclosure, by only executing an intelligent alarm analysis menu, the alarm processing system for an optical transport network can sequentially acquire intra-layer alarms of each layer and a key alarm of a corresponding associated layer so as to directly determine a service fault point through analysis, and can also provide a corresponding processing suggestion according to the service fault point.

The alarm analysis module 120 is configured to determine a service fault point based on the root alarm.

The key alarm may also lead to alarms of the corresponding associated layer in addition to the intra-layer alarms of the current layer, so that searching the key alarm is the most important to determine the service fault point. By reversely searching the key alarm of the associated layer, the final service fault point causing the key alarm is found step by step. Therefore, in the network management system according to the present disclosure, when a fault occurs in a service, the service is layered for alarm processing according the characteristics of the optical transport network and the attributes of the service; and, alarms (including intra-layer alarms and key alarms of associated layers) are collected, processed and analyzed from the topmost layer, layer by layer, according to the affecting and affected relationship between layers and the correlation between alarms. By performing alarm analysis on the faulted service, the layer where the service fault point is located is accurately positioned. Moreover, solutions can be provided, so that the operation and maintenance personnel are freed from complex and heavy alarm analysis operations.

Intelligent alarm analysis by utilizing the network management method according to the present disclosure will be described below in detail, on the condition that the service has been layered according to the characteristics of the optical transport network and the attributes of the service, alarm detection points are extracted and stored in a service data module and the alarm data of each layer is acquired and stored in an alarm data module. The steps are given below.

1. A user initiates an intelligent alarm analysis request.

2. An intra-layer alarm acquisition module calls the service data module and the alarm data module to query the alarm data on each detection point of the current layer.

3. The intra-layer alarm acquisition module analyzes at least the root alarm of the current layer.

4. An associated alarm acquisition module calls the service data module and the alarm data module to query the alarm data on each detection point of the corresponding associated layer.

5. The associated alarm acquisition module analyzes the key alarm of the corresponding associated layer by the intra-layer alarm searching method.

6. The associated alarm acquisition module performs sequential searching in the order of the layers. When the root alarm of the bottommost layer is analyzed, the analysis request is terminated, and the related information of the service fault point and the processing suggestion are output. When an associated layer with no alarm is found, the current layer directly corresponding to the associated layer is a layer where the service fault point is located, the analysis request is terminated, and the related information of the service fault point and the processing suggestion are output.

As can be seen from the above analysis, in the network management system according to the present disclosure, intra-layer alarms of each layer are acquired layer by layer after the service is layered; then, the key alarm of the corresponding associated later is found based on the intra-layer alarms of the current layer according to the correlation between layers; and, the service fault point is determined by utilizing the key alarm. Therefore, the service fault point is accurately positioned by utilizing the correlation between alarms of different layers of the services, and solutions are provided. Accordingly, the operation and maintenance personnel do not need to analyze and process the alarms, and the labor intensity of the operation and maintenance personnel is reduced.

In addition, in the network management system according to the present disclosure, the intra-layer alarms of each layer can be at least graphically displayed, facilitating the operation and maintenance personnel to intuitively know the intra-layer alarms of each layer of the service to prepare in time.

The present disclosure provides a non-transitory computer-readable storage medium having one or more programs stored thereon which, when executed by one or more processors, cause the one or more processors to carry out the alarm processing method for an optical transport network according to any one of claims 1 to 7, and achieves the corresponding technical effects.

The foregoing description merely shows the exemplary implementations of the present application, and is not intended to limit the protection scope of this specification. Any modifications, equivalent replacements and improvements made without departing from the principle of the description shall fall into the protection scope of the description.

The systems, apparatuses, modules or units stated in the one or more implementations may be implemented by computer chips or entities, or implemented by products with a certain function. One typical implementation device is a computer. For example, the computer may be a personal computer, a laptop computer, a cellular phone, a camera phone, a smart phone, a personal digital assistant, a media player, a navigation device, an e-mail device, a game console, a tablet computer, a wearable device, or a combination of any of these devices.

The computer-readable storage medium includes permanent or non-permanent and removable or non-removable mediums which can realize information storage by any method or technology. The information may be computer-readable instructions, data structures, program modules or other data. Examples of the storage medium of the computer include, but not limited to, phase-change random access memories (PRAMs), static random access memories (SRAMs), dynamic random access memories (DRAMs), other types of random access memories (RAMs), read only memories (ROMs), electrically erasable programmable read only memories (EEPROMs), flash memories or other memory technologies, compact disk read only memories (CD-ROMs), digital versatile discs (DVDs) or other optical storages, magnetic cassette tapes, magnetic-tape magnetic disc storages or other magnetic storage devices or any other non-transmission mediums used to stored information accessible by computing devices. As defined herein, the computer-readable medium excludes transitory computer-readable media, such modulated data signals and carriers.

It is also to be noted that, the term "comprise/comprising", "include/including" or any other variant thereof is non-exclusive, so that a process, method, article or device including a series of elements not only includes these elements, but also includes other elements not listed clearly, or further includes inherent elements of this process, method, article or device. Without more restrictions, the element defined by the statement "comprising an/a . . . " does not exclude other identical elements in the process, method, article or device including this element.

The implementations in the description are described in a progressive manner. The same or similar parts of the implementations can refer to each other, and each implementation focuses on the differences from other implementations. Particularly, for the system implementations, since these implementations are basically similar to the method implementations, the system implementations are described briefly, and the related description can refer to a part of the description of the method implementations.

Implementations of the description have been described above. Other implementations shall fall into the scope of the appended claims. In some cases, the acts or steps recorded in the claims can be executed in an order different from those in the implementations and can still achieve the desired results. In addition, the processes described in the accompanying drawings are not necessarily performed in the shown particular order or consecutive order to achieve the desired results. In some implementations, multi-task processing and parallel processing is also possible or may be advantageous.

What is claimed is:

1. An alarm processing method for an optical transport network, comprising:

layering a service: according to characteristics of the optical transport network and attributes of the service, dividing the service into a first layer, a second layer, . . . , a $(n-1)^{th}$ layer, a nth layer from top to down, wherein the $(n-1)^{th}$ layer is a client layer, the nth layer is a service layer of the $(n-1)^{th}$ layer, and n is greater than or equal to 2;

acquiring intra-layer alarms of respective layers of a service layer by layer;

acquiring a root alarm of an associated layer corresponding to a current layer based on the intra-layer alarms; and determining a service fault point based on the root alarm.

2. The alarm processing method for an optical transport network of claim 1, wherein the acquiring intra-layer alarms of respective layers of a service layer by layer comprises:

finding a client layer root alarm occurring in the client layer in a chronological order;

acquiring client layer derivative alarms of the client layer root alarm according to the client layer root alarm; and generating a client layer alarm fault sequence and a client layer root alarm list of the client layer root alarm based on the client layer root alarm and the client layer derivative alarms.

3. The alarm processing method for an optical transport network of claim 2, wherein the acquiring a root alarm of an associated layer corresponding to the current layer based on the intra-layer alarms comprises:

finding, according to an alarm detection point where the client layer root alarm occurs, a service layer key alarm on the service layer corresponding to the alarm detection point;

performing intra-layer alarm retrieval on the service layer to obtain a service layer alarm fault sequence of the service layer;

searching a target service layer alarm fault sequence where the service layer key alarm is located; and acquiring a service layer root alarm of the target service layer alarm fault sequence.

4. The alarm processing method for an optical transport network of claim 3, wherein the determining a service fault point based on the root alarm comprises:

acquiring, based on the service layer root alarm, the service layer alarm fault sequence layer by layer until a bottommost layer;

acquiring the service layer root alarm of the bottommost layer based on the service layer alarm fault sequence of the bottommost layer; and determining, as the service fault point, an alarm detection point where the service layer root alarm of the bottommost layer is located.

5. The alarm processing method for an optical transport network of claim 1, after acquiring intra-layer alarms of respective layers of a service layer by layer, further comprising:

at least graphically displaying the intra-layer alarms of respective layers.

6. The alarm processing method for an optical transport network of claim 5, wherein the at least graphically displaying the intra-layer alarms of respective layers comprises:

at least graphically displaying the client layer alarm fault sequence and the service layer alarm fault sequence corresponding to the alarm detection point in each layer, in an end-to-end manner.

7. An alarm processing apparatus for an optical transport network, comprising:

a service processing module, configured to divide a service into a first layer, a second layer, . . . , a $(n-1)^{th}$ layer, a $n^{th}$ layer from top to down according to characteristics of the optical transport network and attributes of the service, wherein the $(n-1)^{th}$ layer is a client layer, the $n^{th}$ layer is a service layer of the $(n-1)^{th}$ layer, and n is greater than or equal to 2;

an intra-layer alarm acquisition module, configured to acquire intra-layer alarms of respective layers of a service layer by layer;

an associated alarm acquisition module, configured to acquire a root alarm of an associated layer corresponding to a current layer based on the intra-layer alarms; and an alarm analysis module, configured to determine a service fault point based on the root alarm.

8. The alarm processing apparatus for an optical transport network of claim 7, further comprising:

an alarm display module, configured to at least graphically display the intra-layer alarms of respective layers.

9. A network management system, comprising the alarm processing apparatus for an optical transport network of claim 8.

10. A network management system, comprising the alarm processing apparatus for an optical transport network of claim 7.

11. A non-transitory computer readable storage medium having one or more programs stored thereon which, when executed by one or more processors, cause the one or more processors to carry out an alarm processing method for an optical transport network, the method comprising:

layering a service: according to characteristics of the optical transport network and attributes of the service, dividing the service into a first layer, a second layer, . . . , a $(n-1)^{th}$ layer, a $n^{th}$ layer from top to down, wherein the $(n-1)^{th}$ layer is a client layer, the $n^{th}$ layer is a service layer of the $(n-1)^{th}$ layer, and n is greater than or equal to 2;

acquiring intra-layer alarms of respective layers of a service layer by layer;

acquiring a root alarm of an associated layer corresponding to a current layer based on the intra-layer alarms; and determining a service fault point based on the root alarm.

* * * * *